US012803467B2

(12) United States Patent
Zeltwanger

(10) Patent No.: US 12,803,467 B2
(45) Date of Patent: Nov. 17, 2026

(54) DEVICE AND METHOD FOR PROVIDING AN ACTIVATION SIGNAL FOR A PULSE WIDTH MODULATION, POWER CONVERTER AND ELECTRIC DRIVE SYSTEM

(71) Applicant: Robert Bosch GmbH, Stuttgart (DE)

(72) Inventor: Thomas Zeltwanger, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 18/855,391

(22) PCT Filed: Feb. 1, 2023

(86) PCT No.: PCT/EP2023/052430
§ 371 (c)(1),
(2) Date: Oct. 9, 2024

(87) PCT Pub. No.: WO2023/198336
PCT Pub. Date: Oct. 19, 2023

(65) Prior Publication Data

US 2025/0337343 A1 Oct. 30, 2025

(30) Foreign Application Priority Data

Apr. 13, 2022 (DE) ..................... 10 2022 203 730.8

(51) Int. Cl.
*H02M 7/5387* (2007.01)
*H02M 1/36* (2007.01)
*H02P 27/08* (2006.01)

(52) U.S. Cl.
CPC ......... *H02M 7/53873* (2013.01); *H02M 1/36* (2013.01); *H02P 27/08* (2013.01)

(58) Field of Classification Search
CPC ...... H02M 7/53873; H02M 1/36; H02M 1/32; H02M 7/5395; H02M 1/38; H02P 27/08;
(Continued)

(56) References Cited

U.S. PATENT DOCUMENTS 11,031,899 B1 * 6/2021 Turcanu .................. H02M 7/42

FOREIGN PATENT DOCUMENTS

DE 102016220892 A1 4/2018
DE 102017211196 A1 5/2018
(Continued)

OTHER PUBLICATIONS

Translation of International Search Report for Application No. PCT/EP2023/052430 dated Apr. 20, 2023 (2 pages).

*Primary Examiner* — Jung Kim
(74) *Attorney, Agent, or Firm* — Michael Best & Friedrich LLP

(57) ABSTRACT

Devices and methods for providing activation pulses for a pulse width modulated activation, an electrical power converter, and an electric drive system having such a power converter. The activation signal includes a sequence of pulse periods having a specified period duration. One example device is configured to determine a pulse width for the activation signal of the pulse width modulation, generate a centered pulse with the determined pulse width if the determined pulse width is less than the period duration of the activation signal minus a specified minimum duration, and generate a pulse with a temporal position within the pulse period deviating from a centered pulse if the determined pulse width is greater than the period duration of the activation signal minus the specified minimum duration.

9 Claims, 2 Drawing Sheets

(58) Field of Classification Search
CPC ................ G01R 29/023; G01R 29/027; G01R 29/0273; H03K 5/26; H03K 9/08
See application file for complete search history.

(56) References Cited

FOREIGN PATENT DOCUMENTS

| | | | |
|---|---|---|---|
| DE | 102017207297 | A1 | 11/2018 |
| EP | 1589650 | A2 | 10/2005 |
| EP | 3547528 | A1 | 10/2019 |
| GB | 2380790 | A | 4/2003 |

* cited by examiner

DEVICE AND METHOD FOR PROVIDING AN ACTIVATION SIGNAL FOR A PULSE WIDTH MODULATION, POWER CONVERTER AND ELECTRIC DRIVE SYSTEM

BACKGROUND

The present invention relates to a device and method for providing an activation signal for a pulse width modulation, an electrical power converter, and an electric drive system having such a power converter.

Electrical power converters, in particular inverters, typically include power electronic components with semiconductor switching elements. Through targeted opening and closing of these semiconductor switching elements, an alternating voltage with a desired amplitude and frequency can be generated from a supplied DC voltage. For this purpose, the semiconductor circuit elements are usually activated by pulse width modulated (PWM) activation signals.

For example, publication DE 10 2016 220 892 A1 discloses a method for activating a power converter by way of space vector pulse width modulation, wherein an activation method is proposed, which is intended to reduce the number of switching operations.

In such pulse width-modulated activation methods, a minimum pulse width is to be observed, which specifies a time that is to be complied with between two switching operations.

SUMMARY

The present invention creates a device and a method for providing an activation signal for a pulse width modulation, an electrical power converter and an electrical drive system with the features of the disclosure.

The following is therefore provided:

A device for providing a activation signal for a pulse width modulation. The activation signal comprises a sequence of pulse periods with a specified period duration. The device is designed to determine a pulse width for the activation signal of the pulse width modulation. Furthermore, the device is designed to generate a centered pulse with the determined pulse width if the determined pulse width is less than a period duration of the activation signal minus a specified minimum duration. Furthermore, the device is designed to generate a pulse with a temporal position within the pulse period that deviates from a centered pulse if the determined pulse width is greater than the period duration of the activation signal minus the specified minimum duration.

The following is furthermore provided:

An electrical power converter having at least one half bridge, a driver stage and a device according to the invention for providing an activation signal for a pulse width modulation. The at least one half bridge is designed to be connected to a DC voltage source on the input side. Further, the at least one half-bridge comprises two semiconductor switching elements connected in series. The driver stage is designed to activate the switching elements of the at least one half-bridge using the pulses provided by the device for generating an activation signal.

In addition, the following is provided:

An electrical drive system with an electric machine and an electrical power converter according to the invention. The electrical power converter is designed to power the electrical machine on the output side.

Finally, the following is provided:

A method of providing an activation signal for a pulse width modulation. The activation signal comprises a sequence of pulse periods with a specified period duration. The method comprises a step of determining a pulse width of the activation signal for the pulse width modulation. Further, the method comprises a step for generating a centered pulse with the determined pulse width if the determined pulse width is less than or equal to the period duration of the activation signal minus a specified minimum duration. Finally, the method comprises a step for generating a pulse with a temporal position within the pulse period that deviates from a centered pulse, if the determined pulse width is greater than the period duration of the activation signal minus the specified minimum duration.

The present invention is based on the recognition that a specified minimum switching duration must be observed in each case when switching semiconductor switching elements on and off between two switching operations. If, for example, a pulse width modulated activation of such semiconductor switching elements occurs, a duty cycle of such pulse width modulated activation cannot be fully utilized from 0 to 100 percent without violating this minimum pulse width requirement. Therefore, a pulse width modulated activation is only possible for a range of duty cycles in which the minimum pulse width between two successive pulses can be complied with.

It is therefore an idea of the present invention to take this knowledge into account and to create a device as well as a method for providing activation signals for a pulse width modulation, which allows for pulse width modulation over the widest possible range of duty cycles. Furthermore, the transition between a pulse width modulated activation and the state of the permanent activation is also to be improved.

For this purpose, for example, a pulse width modulation with centered pulses of a specified duty cycle in each case can be generated for as long as this is possible while complying with the required minimum pulse width. Furthermore, it is contemplated to generate a pulse that is shifted to the start or end of the pulse period for duty cycles below 100 percent, in which centered pulses would violate the requirements of the minimum pulse width.

In this way, it is possible to realize the pulse width modulated driving of semiconductor switching elements over a wider range of the duty cycle without having to violate the required minimum pulse width to do so.

By shifting the pulse width within the pulse period, it is possible to adjust the switching times in such a way that, especially in conjunction with preceding or subsequent pulses, the requirements of the minimum pulse width can still be complied with even at very large duty cycles. If, for example, a current pulse is followed by another pulse with a duty cycle of 100 percent, i.e., permanent activation during the entire pulse period, the current pulse can be shifted to the end of the pulse period. In this way, no switching operation is required between the end of the current pulse and the subsequent pulse. Accordingly, the requirement of the minimum pulse width cannot be violated. Likewise, following a pulse period with full activation, i.e. a duty cycle of 100 percent, a subsequent pulse may be postponed such that no switching operation is required here between the pulse with a duty cycle of 100 percent and the subsequent pulse. Accordingly, the complete switch-off time is postponed to the end of such a pulse period, which also makes it easier to meet the requirements of the minimum pulse width.

The pulse period here is understood as a complete interval of the activation signal with the period duration of the pulse width modulation. The pulse period thus corresponds to a portion of a activation signal with the period duration of the pulse width modulation. If a time grid with this period duration is used to form the activation signal for the pulse width modulation, a pulse period corresponds to a section of the activation signal between two grid points of this time grid.

The pulse width refers to the switch-on time of a pulse within the pulse period. Thus, the duty cycle results from the quotient of the pulse width divided by the pulse period. A centered pulse in this respect is a pulse that is arranged within the pulse period such that an amount of time from the beginning to the first switching edge is as long as the amount of time from the second switching edge to the end of the pulse period. In other words, the duration from the beginning of the pulse period to the first flank of the pulse is as long as the duration of the second flank of the pulse to the end of the pulse period.

According to one embodiment, the specified minimum duration corresponds to the minimum pulse width for activating a power electronic component. For example, a minimum pulse width may be assumed as the minimum duration corresponding to the time interval between two consecutive switching operations of a semiconductor switch. For example, this minimum pulse width may correspond to the time interval between a switch-on operation and a switch-off operation or a switch-off operation and a switch-on operation of a semiconductor switch.

According to one embodiment, the device to supply the drive signal is designed to generate a pulse with a start matching the start of a pulse period if the determined pulse width is greater than a period duration of the drive signal minus the specified minimum duration. Further, the device may also generate a pulse with an end matching the end of the pulse period if the determined pulse width is greater than a period duration of the activation signal minus the specified minimum duration. In this way, a generated pulse is shifted to either the start or the end of the pulse period if, with a centered pulse with the same pulse width at the start and end, less than half of the minimum pulse width would remain in each case.

According to one embodiment, the device for providing the activation signal is designed to generate a pulse with a start corresponding to a centered pulse with the determined pulse width and with a pulse duration extended to the end of the pulse period if the determined pulse width is greater than a period duration of the activation signal minus the specified minimum duration, if a subsequent pulse has a duty cycle of 100 percent. In other words, an originally centered pulse is extended to the end of the pulse period if the subsequent pulse has a duty cycle of 100 percent, i.e. if it corresponds to an activation over the entire pulse period. A switching operation at the end can thereby be avoided. Consequently, the requirement of the minimum pulse width cannot be violated.

According to one embodiment, the device for providing the activation signal is designed to generate a pulse with a start corresponding to a centered pulse with the determined pulse width and with a pulse duration which is extended to the end of the pulse period if the determined pulse width is greater than a specified threshold value and the determined pulse width is greater than a pulse width of a directly preceding pulse. If the pulse width of a current pulse is greater than the pulse width of a previous pulse, it can be assumed that the pulse width will still increase further in the subsequent pulse. Thus, for example, a threshold value can be set such that the specified minimum pulse width can no longer be complied with if the threshold value for the pulse width is exceeded. Thus, it is expected that subsequent pulses will have a duty cycle of 100 percent. For the purposes of transition, the current pulse can therefore be extended to the end, so that no switch-off procedure is required and thus the requirements of the minimum pulse width are also not violated.

According to one embodiment, the device for providing a activation signal is designed to generate a pulse the start of which corresponds to the start of the pulse period and the pulse duration of which corresponds to the determined pulse width if a preceding pulse has a duty cycle of 100 percent. In this way, when the full drive is transitioned with a duty cycle of 100 percent to smaller duty cycles, the pulse may first be shifted to the start of the pulse period. This leaves a longer period of time at the end of the pulse period, which allows the minimum pulse width to be complied with even at high duty cycles.

The above embodiments and further developments can be combined with one another in any desired manner insofar as advantageous. Additional embodiments, further developments, and implementations of the invention also include inventive feature combinations not described or explicitly specified hereinabove or hereinafter with respect to exemplary embodiments. The skilled person will in particular also add individual aspects as improvements or additions to the respective basic forms of the invention.

BRIEF DESCRIPTION OF THE DRAWINGS

Further features and advantages of the invention are explained hereinafter with reference to the drawings. Shown are.

DETAILED DESCRIPTION

Figure 1:
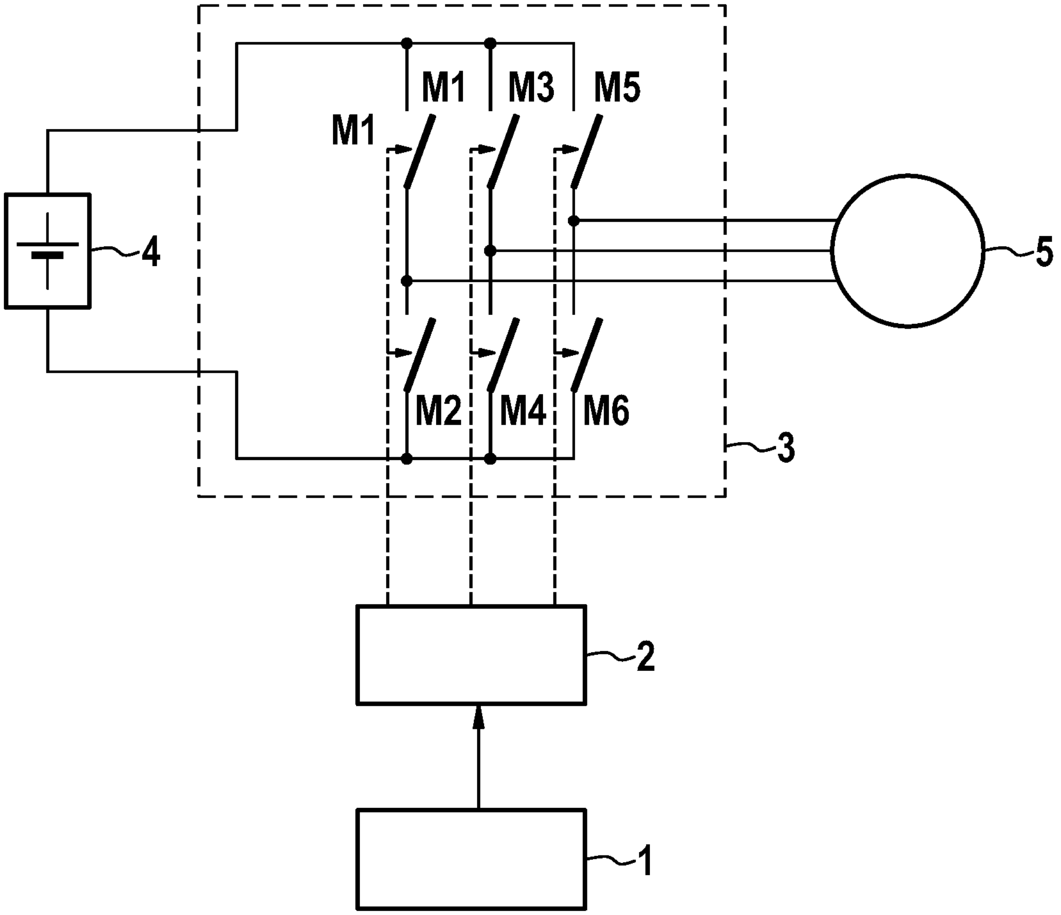
FIG. 1: a schematic block diagram of an electric drive system with a power converter according to one embodiment.

FIG. 1 shows a schematic block diagram of an electric drive system according to one embodiment. A DC voltage source 4 may provide a DC voltage at the input of an electrical power converter 3. This supplied DC voltage can be converted by means of the power converter 3 to a single or multi-phase AC voltage, which is supplied to an electric machine 5. In this case, the electrical power converter 3 can comprise power electronic components, for example, so-called B2 bridges. In particular, one B2 bridge can be provided for each phase of an output-side supplied AC voltage. Three B2 bridges can thus be combined to form a so-called B6 bridge for three-phase AC voltage. Each B2 bridge comprises two switching elements M1 to M6, connected in series. In this case, the upper switching elements M1, M3 and M5 are activated in a complementary manner to the lower switching elements M2, M4 and M6. Further, a dead time may be provided between switching off the upper or lower switching elements and switching on the complementary switching elements, respectively. A short circuit due to a delayed switching behavior or the like can be avoided in this way, for example.

The switching signals required for activating the switching elements M1 to M6 can be generated by a device 1 for providing activation signals. These generated activation signals may be amplified by a driver stage 2 to provide the switching capacity necessary for activating the switching elements M1 to M6.

To generate the AC voltage by the power converter 3, the switching elements M1 to M6 can in particular be controlled by pulse width modulated activation. For example, the duty cycle of this pulse width modulated activation can be determined using a specified setpoint or the like. Since this step can be done in a known, conventional manner, this will not be discussed in more detail.

Figure 2:
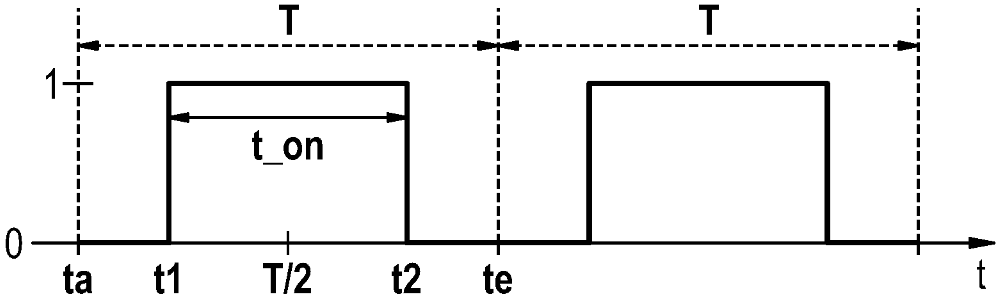
FIG. 2: a schematic representation of a pulse for a pulse width modulated activation.

FIG. 2 shows a schematic diagram illustrating the basic principle of pulse width modulated activation. Pulses with a specified period duration T are generated for pulse width modulated activation. In principle, a fixed period duration T and a corresponding fixed frequency can be used for this purpose. However, it is also possible to vary the period duration T or the corresponding frequency during operation.

During each period of time, T, a pulse P is generated. For example, at time t1 the pulse may change from logical zero to logical one and at time t2 the pulse may change from logical one to logical zero. Thus, from the beginning to time ta to time t1 the pulse is at logical zero, from t1 to t2 the pulse is at logical one and then from t2 to the end of the pulse at te the pulse is once again at logical zero. In particular, such a pulse P can be generated as a centered pulse so that the time period from t1 to the middle of the pulse is as long at T/2 as the time from the middle of the pulse at T/2 to the switch-off time t2 of the pulse P. This results in a switch-on time t_on of t2−t1. A duty cycle of the pulse P to t_on/T is calculated on this basis.

For example, to activate a half bridge of the power converter 3 shown in FIG. 1, an upper switching element M1 can be activated according to a pulse width modulated signal generated in this way, while the corresponding lower switching element M2 is activated with the inverse signal.

When activating the switching elements M1 to M6, it must be ensured that a specified minimum pulse width t_min is observed between two successive switching operations, i.e. switch-on and a subsequent switch-off operation or a switch-off operation and a subsequent switch-on operation. As the duty cycle increases, however, it is possible that the time period from the switch-off time t2 of a pulse to the switch-on time t1 of a subsequent pulse will be less than this specified minimum pulse width t_min. In this case, switching is no longer possible and the corresponding switching elements are switched on or off over the entire period duration T. This corresponds to a duty cycle of 100 percent. Consequently, depending on the period duration T selected and the specified minimum pulse width, the pulse width modulation may only be continuously adjusted up to a duty cycle of less than 100 percent. Then, there is a jump to the duty cycle of 100 percent due to the specified minimum pulse width.

Figure 3:
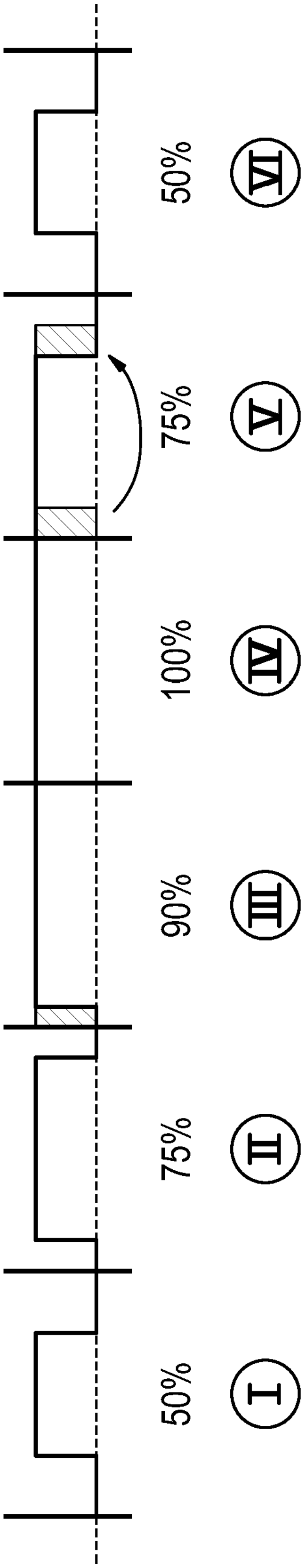
FIG. 3: a diagram illustrating the principle for providing the activation pulses according to one embodiment.

FIG. 3 shows a schematic representation of a switching pattern sequence for generating activation signals for pulse width modulated activation, according to one embodiment. A centered pulse is shown in each of Sections I and II respectively, wherein the duty cycle is low enough in each case that the requirement for the minimum pulse width can be complied with between the pulses. In the further course, however, the duty cycle is to be increased further for both periods III and IV, so that a duty cycle of 100 percent is achieved in period IV. However, this would result in, during the transition from period III to period IV, the switch-off in period III occurring so late that the requirement of the minimum pulse width would be violated. The duty cycle of 90% shown in section II is to be understood as an example only. The extending or shifting of the pulse up to the end of the period is carried out in particular depending on the minimum pulse width.

According to the present invention, therefore, no switch-off procedure is provided in the pulse in period III. Accordingly, the pulse in period III transitions directly into the pulse in period IV. For this purpose, for example, the pulse in period III can simply be extended until the end of the period duration. Alternatively, it is also possible to delay the switch-on time in period III to the extent that the resulting pulse has the originally desired duty cycle. In other words, a right-justified pulse is formed with the desired duty cycle. The switch-off time required in this case is shifted entirely to the start of the pulse.

As already stated, the following pulse IV has a duty cycle of 100 percent, i.e., no switching operation takes place in this pulse, in particular no change to logical zero. This state may also extend over several periods.

If a duty cycle of 100 percent should subsequently be switched to a lower duty cycle, then a pulse can first be formed, as shown in period V, which begins with logical one and the proportion of logical zero of which is shifted entirely to the end. This creates a left-justified pulse with the desired duty cycle. In particular, this also results in a longer switch-off time at the end of such a pulse, so that the required minimum pulse width can also be achieved for the transition to subsequent pulses in period VI.

Thus, in increasing sequences, i.e. pulse sequences with increasing duty cycles, a right-justified pulse is thus formed during the transition to holding sequences, i.e. pulses with a duty cycle of 100 percent. In the transition from holding sequences to decreasing sequences with a continuously decreasing duty cycle, a left-justified pulse is formed.

Although the present method has been described in connection with pulses in which a transition from logical zero to logical one takes place at the beginning and a transition from logical one to logical zero takes place at the end, the principle according to the invention can also be applied to complementary pulses in which a transition from logical one to logical zero takes place first and a transition from logical zero to logical one takes place subsequently.

Figure 4:
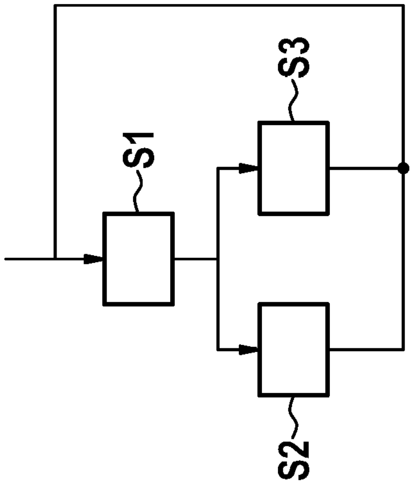
FIG. 4: a flow chart that forms the basis for a method for providing activation signals according to one embodiment.

FIG. 4 shows a flow chart as underlying a method for providing activation pulses for a pulse width modulation. In step S1, a pulse width is first determined for an activation signal of the pulse width modulation. If the requirements for the minimum pulse width are met, for example the period duration of the activation signal minus a specified minimum duration is less than or at least equal to the determined pulse width, a centered pulse is generated in step S2.

If the determined pulse width is greater than the period duration of the activation signal minus the specified minimum duration, a pulse is generated with a temporal position within a section with the period duration of the pulse width modulation that deviates from a centered pulse.

In particular, as already described above, when transitioning from a rising sequence, i.e., from a duty sequence increasing from period-to-period, to a holding sequence, i.e., a period having a duty cycle of 100 percent, a right-justified pulse may be formed. Further, a left-justified pulse may first be formed from the transition from a holding sequence to a decreasing sequence, i.e., a sequence with decreasing duty cycles of successive periods.

For example, a pulse with the respective specified duty cycle may be formed for the formation of the right or left-justified pulses. Alternatively, it is also possible to use a centered pulse with the desired duty cycle as a basis, and to extend such a pulse at the start or end respectively up to the beginning or the end of the period.

In summary, the present invention relates to forming activation pulses for pulse width modulated activation. In this case, instead of centered pulses, pulses may be formed that are shifted to the edge of a section with the period duration of the pulse width modulation. In this way, the requirements for a minimum pulse width between two switching operations may be better complied with.

The invention claimed is:

1. A device (1) for providing an activation signal for pulse width modulation, wherein the activation signal comprises a sequence of pulse periods having a specified period duration (T), the device (1) configured to determine a pulse width (t_on) for the activation signal of the pulse width modulation;

generate a centered pulse with the determined pulse width (t_on) if the determined pulse width (t_on) is less than the period duration (T) of the activation signal minus a specified minimum duration, and generate a pulse with a temporal position within the pulse period deviating from a centered pulse if the determined pulse width (t_on) is greater than the period duration (T) of the activation signal minus the specified minimum duration.

2. The device (1) according to claim 1, wherein the specified minimum duration is a minimum pulse width for activating a power electronic component.

3. The device (1) according to claim 1, wherein the device (1) is configured to generate a pulse with a beginning matching the start (ta) of a pulse period and/or with an end matching the end (te) of the pulse period if the determined pulse width (t_on) is greater than the period duration (T) of the activation signal minus the specified minimum duration.

4. The device (1) according to claim 1, wherein the device (1) is configured to generate a pulse, the start of which corresponds to a centered pulse with the determined pulse width and with a pulse duration of which is extended or postponed until the end of the pulse period, if the determined pulse width (t_on) is greater than a period duration (T) of the activation signal minus a specified minimum duration and a subsequent pulse has a duty cycle of 100 percent.

5. The device (1) according to claim 1, wherein the device (1) is configured to generate a pulse with a start corresponding to a centered pulse with the determined pulse width and with a pulse duration extended or shifted to the end (Te) of the pulse period if the determined pulse width (t_on) is greater than a specified threshold value and the determined pulse width (t_on) is greater than a directly preceding pulse width.

6. The device (1) according to claim 1, wherein the device (1) is configured to generate a pulse, the start of which corresponds to the start (ta) of the pulse period and the pulse duration of which corresponds to the determined pulse width (t_on), if a preceding pulse has a duty cycle of 100 percent.

7. An electrical system including an electrical power converter, the electrical power converter comprising:

at least one half bridge configured to be connected on the input side to a DC voltage source (4);

a device (1) for providing an activation signal for a pulse width modulation and configured to determine a pulse width (t_on) for the activation signal of the pulse width modulation;

generate a centered pulse with the determined pulse width (t_on) if the determined pulse width (t_on) is less than the period duration (T) of the activation signal minus a specified minimum duration, and generate a pulse with a temporal position within the pulse period deviating from a centered pulse if the determined pulse width (t_on) is greater than the period duration (T) of the activation signal minus the specified minimum duration; and a driver stage (2) configured to activate switching elements (M1-M6) of the at least one half-bridge using the pulses generated by the device (1) for providing the activation signal.

8. The electrical system of claim 7, further comprising:

an electric machine (5); and wherein the electrical power converter is configured to power the electric machine (5) on the output side.

9. A method of providing an activation signal for pulse width modulation, wherein the activation signal comprises a sequence of pulse periods having a specified period duration (T), the method comprising the steps of:

determining (S1) a pulse width (t_on) of the activation signal for the pulse width modulation;

generating (S2) a centered pulse having the determined pulse width (t_on) if the determined pulse width (t_on) is less than a period duration (T) of the activation signal minus a specified minimum duration, and generating (S3) a pulse with a temporal position within the pulse period deviating from a centered pulse if the determined pulse width (t_on) is greater than the period duration (T) of the activation signal minus the specified minimum duration.

* * * * *